United States Patent
Kneeland

[15] 3,677,033
[45] July 18, 1972

[54] COUPLING

[72] Inventor: David Kneeland, 1001 W. U.S. 56 Highway, Olathe, Kans. 66061

[22] Filed: Oct. 12, 1970

[21] Appl. No.: 79,867

[52] U.S. Cl. ..............................................................64/28 R
[51] Int. Cl................................................................F16d 7/00
[58] Field of Search..........................64/10, 9, 14, 28, 30, 32

[56] References Cited

UNITED STATES PATENTS

| | | | |
|---|---|---|---|
| 1,429,980 | 9/1922 | Spangler | 64/9 R |
| 2,924,082 | 2/1960 | Reich | 64/10 X |
| 2,930,210 | 3/1960 | Farmer | 64/10 |

*Primary Examiner*—Edward G. Favors
*Attorney*—Fishburn, Gold & Litman

[57] ABSTRACT

Mating coupling members for transferring motion from one member to another are disclosed which each have a plurality of pins positioned, shaped, and sized to mate with pins of another coupling member wherein each pin of one coupling member is received between and in line contact with a pair of adjacent pins of an other coupling member. Coupling members having cylindrical pins and truncated cone-shaped pins and members having shields enclosing the pins are disclosed as exemplary of the inventive concept.

9 Claims, 6 Drawing Figures

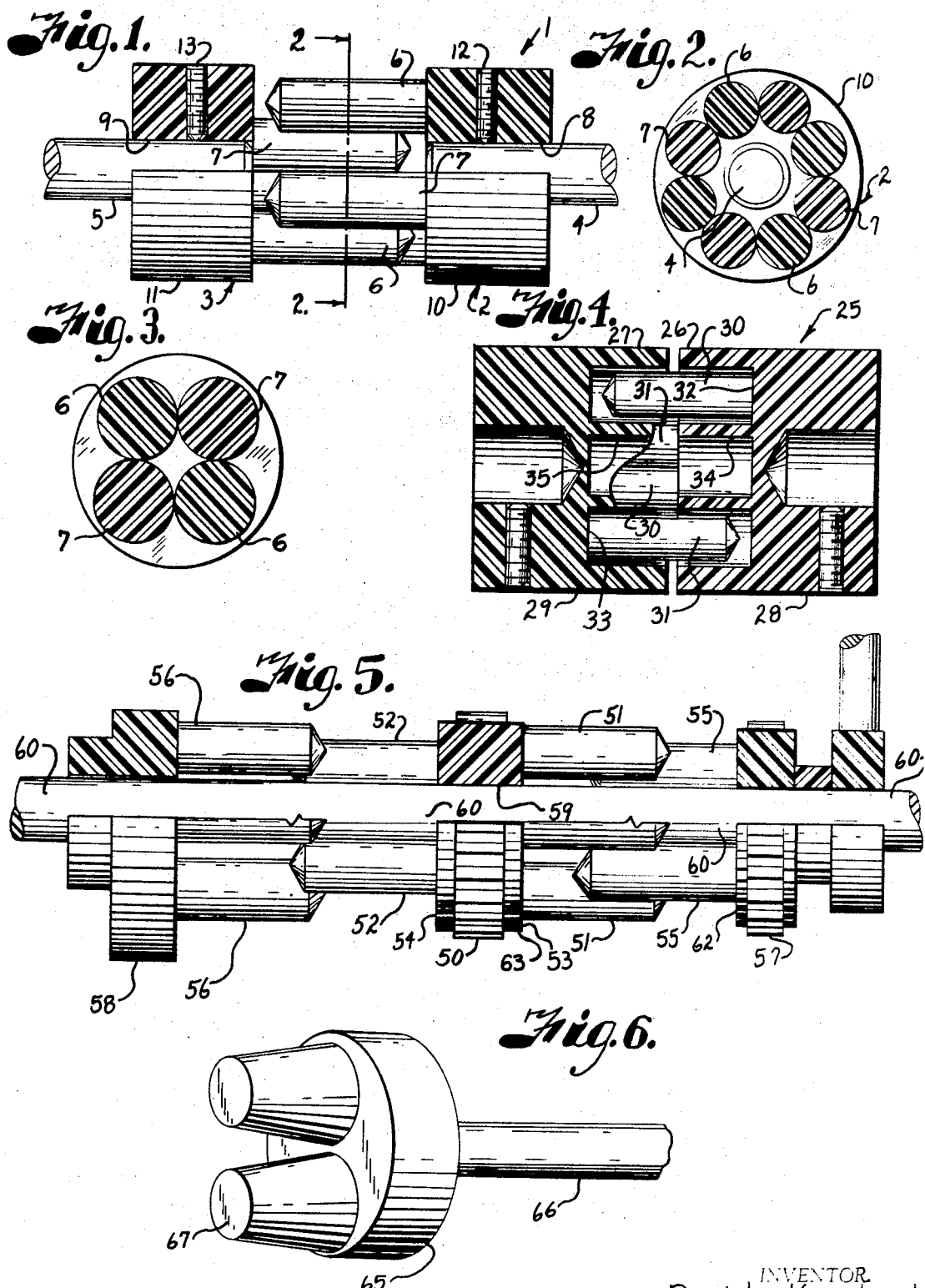

COUPLING

The present invention relates to couplings adapted to transfer motion from one member to another and more particularly to couplings having facing mating coupling members each having a plurality of pins extending therefrom wherein each pin of one coupling member is received between and in line contact with a pair of adjacent pins of an other coupling member.

The principal objects of the present invention are: to provide a coupling for transmitting motion between a pair of coupling members each having pins extending therefrom with the pins of one coupling member each being received between and in line engagement or contact with a pair of adjacent pins extending from the other coupling member whereby rotation of one of the coupling members effects or transfers rotation to the other coupling member; to provide such a coupling adapted to maintain a substantially constant velocity and substantially zero play between the coupling members during the transferring of rotation from one member to another; to provide such a coupling which is self-aligning wherein engagement of the pins in line contact axially aligns the coupling members having the pins extending therefrom; to provide such a coupling having an overload safety feature which effects disengagement of the pins when the torque exceeds a selected value; to provide such a coupling having a hood or shield mounted on one or each coupling member thereof to retain flexible pins in interengagement within the hood or shield; to provide such a coupling which is versatile in use and construction wherein the pins may be rigid, flexible or semi-rigid; to provide such a coupling wherein at least one of the coupling members has a plurality of circumferentially spaced gear teeth extending from the periphery thereof for interengaging with a member having similar teeth; to provide such a coupling having a plurality of rotatable members having interengageable pins wherein all the rotatable members are driven by rotation of one rotatable member, and to provide such a coupling which is economical to manufacture, which may be formed of any material that may be cast or molded without the necessity of machining and which is particularly well adapted for the proposed use.

Other objects and advantages of this invention will become apparent from the following description taken in connection with the accompanying drawings wherein are set forth by way of illustration and example certain embodiments of this invention.

FIG. 1 is a side elevational view of a coupling embodying features of the present invention.

FIG. 2 is a transverse sectional view taken on line 2—2, FIG. 1 and showing an arrangement of pins extending from each coupling member to illustrate line contact of each pin of one coupling member with a pair of adjacent pins of the other coupling member.

FIG. 3 is a transverse sectional view similar to FIG. 2 and taken through a modified coupling showing a minimum number of pins extending from each of a pair of parallel facing coupling members.

FIG. 4 is a longitudinal sectional view of a modified coupling wherein the members thereof each have a hood or shield member for retaining the pins in cooperative interengagement.

FIG. 5 is a side elevational view of a further modified coupling member and coupling members for selectively mating therewith.

FIG. 6 is a perspective view of an additional modified form of coupling member having truncated cone-shaped pins.

Referring more in detail to the drawings:

As required, detailed embodiments of the invention are disclosed herein. However, it is to be understood that these embodiments are merely exemplary of the invention which may be embodied in many forms that are radically different from the illustrative embodiments presented herein. Therefore, specific structural and functional details disclosed herein are not to be interpreted as limiting, but merely as a basis for the claims actually defining the scope of this invention. In this regard, it is to be recognized that motion transferring structures in accordance herewith, such as coupling members, may be embodied in various forms, such as discs, drums, cans and the like, and furthermore that such structures may effect various motions, such as rotation, reciprocation, oscillation, and the like and to selectively activate and interrupt electrical or other suitable circuits. However, the disclosure hereof is presented only as representative basis for teaching one skilled in the art to variously employ the present invention in virtually any appropriate detailed structure.

Referring to FIGS. 1 and 2, the reference numeral 1 generally designates a coupling including a pair of rotatable coupling members 2 and 3 for coupling together a pair of adjacent substantially coaxial rotary elements, such as shafts 4 and 5, whereby rotation of one of rotary elements effects rotation of the other rotary element. The coupling members 2 and 3 are arranged in generally facing relation and each of the coupling members 2 and 3 have pins 6 and 7 respectively extending from facing surfaces thereof and arranged in interlocking patterns, as later described, such that each pin 6 of the coupling member 2 is received between and in line contact with a pair of adjacent pins of the coupling member 3 and the pins 7 are in like contact with the pins 6.

The coupling members 2 and 3 are illustrated as generally planar and circular discs having bores 8 and 9 respectively extending through the center thereof for receiving an end of the shaft 4 and 5 respectively. The shafts 4 and 5 are secured within the bores 8 and 9 respectively by any suitable means and in the illustrated coupling, each coupling member 2 and 3 has a threaded recess extending radially inwardly from peripheral surfaces 10 and 11 of the coupling members 2 and 3 respectively and communicating with the bores 8 and 9 for receiving suitable fastening members, such as set screws 12 and 13, which may be moved into engagement with the end portion of the shafts 4 and 5 for securing the coupling members 2 and 3 respectively thereon.

The pins 6 and 7 extend from facing surfaces of the coupling members 2 and 3 and are circumferentially spaced in a circular pattern concentric with the axis of rotation of the respective coupling member. The pins extending from each of the coupling members 2 and 3 are spaced apart a distance sufficient wherein when the coupling members mate, a pin extending from one member is between and in line contact with a pair of adjacent pins of the other coupling member, therefore, the coupling members 2 and 3 each have an equal number of pins extending from the facing surfaces thereof with the number of spaces between the pins of one coupling member being the same as the number of pins of the other coupling member and all adjacent pins supplementing each other.

The number of pins extending from each coupling member may be any number greater than one, however, FIGS. 1 and 2 illustrate four pins extending from each coupling member and FIG. 3 illustrates two pins, which is a minimum number of pins, extending from each coupling member.

The pins 6 and 7 may be of many shapes, however, the pins are illustrated as generally cylindrical members and the circular arrangement thereof effects tangential or line contact between adjacent pins 6 and 7 for the engaged length of the pins.

The coupling is of a structure that difference in rigidity or flexibility of the pins provide a difference in the character of the drive and the coupling members and the pins extending therefrom are preferably, but not necessarily integral and formed of any suitable material adapted to be cast or molded. The coupling members and the integral pins extending therefrom may be substantially rigid members whereby the rotatable members 2 and 3 rotate at a substantially constant and identical velocity and a change in the rotational speed of one of the shafts effects an immediate and corresponding change in the rotary speed of the other shaft and cooperative engagement of the pins 6 and 7 effects axial alignment of the shafts 4 and 5.

The coupling structure is adapted to absorb shock and to correct some misalignment between the shafts 4 and 5 particularly when at least one of the coupling members and the pins extending therefrom is formed of a suitable flexible material, such as one of a number of synthetic resinous materials selected from the thermoplastics including polypropylene, polystyrene, polyvinylchloride, and acrylonitrile-butadiene-styrene (commonly referred to as ABS) and thermoset plastics including phenolformaldehyde, polyester, and epoxy resins.

Forming a coupling of members constructed as described and illustrated in FIGS. 1 to 3 inclusive, is effective to coaxially align the shafts 4 and 5 and center the coupling members 2 and 3 by interengagement between the pins 6 and 7 and the line contact between the pins 6 and 7 provides end support for the shafts 4 and 5. When the pins 6 and 7 are substantially rigid members rotation of one of the shafts and the coupling member mounted thereon effects a substantially identical speed of rotation of the other rotatable member. When one of the group of pins 6 and 7 is substantially rigid and the other group of pins is flexible, rotation of one of the coupling members may effect some varying in the speed of rotation of the other coupling member and the respective shaft. When each of the group of pins are rigid, rotation of one of the rotatable members effects a high torque change between the rotatable members 2 and 3.

FIG. 4 illustrates a modified coupling 25 including outer flanges or annular shield members 26 and 27 mounted on coupling members 28 and 29 respectively each having a plurality of circumferentially spaced pins 30 and 31 extending from respective facing surfaces 32 and 33 thereof. The outer flanges or shield members 26 and 27 surround the pins 30 and 31 respectively to retain the pins of one of the coupling members in engagement with the pins of the other coupling member.

In the illustrated structure, the facing surfaces 32 and 33 of the coupling members 28 and 29 each have an inner shield or portion 34 and 35 respectively extending therefrom and coaxial with the respective coupling member and having a free end positioned intermediate the ends of the pins 30 and 31 respectively. The free end of the coaxial inner shields or portions 34 and 35 and the free end of the outer flanges or shield members 26 and 27 terminate in a common plane intermediate the ends of the respective pins 30 and 31, thereby having the pins enclosed within and surrounded by the outer flanges or shield members 26 and 27 and the inner shields or portions 34 and 35 whereby when the pins 30 and 31 are flexible members and when the torque applied to the pins 30 and 31 exceeds a selected magnitude which would cause the pins 30 and 31 to be moved out of mutual engagement, the outer flanges or shield members 26 and 27 and the inner shields or portions 34 and 35 cooperate to retain the pins 30 and 31 therebetween to prevent damage to the pins resulting from the excess torque and disengagement.

FIG. 5 illustrates a modified coupling member 50 having pins 51 and 52 extending from opposite faces 53 and 54 of the modified coupling member 50 for mating interengagement with pins 55 and 56 extending from end coupling members 57 and 58 respectively. Generally one of the coupling members 50, 57, and 58 is suitably secured to a shaft and rotatable therewith. In the illustrated embodiment, the modified coupling member 50 has a bore 59 therethrough positioned coaxial with the modified coupling member 50 to receive a shaft 60 therethrough and be secured thereto, as by set screws. The end coupling members 57 and 58 may be mounted on the shaft 60 with the modified coupling member 50 therebetween and the end coupling members 57 and 58 are illustrated as movable along the shaft 60 by any suitable means, such as arms or the like, to effect a clutch action between one or both of the coupling members 57 and 58 and the modified coupling member 50.

Use and mounting of the modified coupling member 50 is versatile, such as having end portions of shafts suitably secured to the end coupling members 57 and 58 respectively whereby rotation of one shaft rotates the end coupling member mounted thereon, modified coupling member 50, the other end coupling member, and the shaft having same mounted thereon.

At least one of the coupling members 50, 57, and 58 may have a plurality of circumferentially spaced teeth 62 extending from a peripheral surface 63 thereof for interengaging with a member having similar teeth whereby rotation of the shaft 60 transmits rotation between the respective coupling member and a shaft parallel with or perpendicular to the shaft having the coupling members mounted thereon depending on the configuration of the teeth 62, for example, when the teeth 62 are beveled, rotary motion may be transmitted between the shaft 60 and a shaft (not shown) substantially normal or perpendicular thereto.

It is preferable that the teeth 62 extend from the peripheral surface of the modified coupling member 50 and the modified coupling member 50 may have flanges or shields, as shown in FIG. 4, extending from the opposite faces 53 and 54 respectively to surround the pins 51 and 52 extending from the opposite faces 53 and 54 to thereby retain the pins 51 and 52 in engagement with the pins of adjacent coupling members.

The peripheral surface of the coupling members 57 and 58 may be formed as cam surfaces so that rotation of the respective coupling member may effect any desired motion or effect intermittent activation of a suitable switch to complete and/or interrupt an electrical hydraulic, pneumatic optical, magnetic or other circuit which is operative to perform a desired function.

FIG. 6 illustrates an additional modified coupling member 65 suitably mounted on an adjacent rotary element, such as a shaft 66. The illustrated coupling member 65 has a minimum number of pins 67 extending therefrom and mating engagement between like pins is operative to correct shaft offset and angular misalignment and to permit varying clearance between a like coupling member. The pins 67 are illustrated as truncated cones having the larger diameter thereof adjacent the respective coupling member 65 thereby providing increased strength in the pins at the base thereof.

In a coupling wherein each of a pair of coupling members 65 have a pair of the truncated cone-shaped pins 67 extending from facing surfaces thereof, the space or clearance between the coupling members 65 may be adjusted by movement of one of the coupling members 65 toward and away from the other coupling member thereby varying the space therebetween. Contact is maintained between the pins 67 of the modified coupling members 65 during the adjustment of the space between the coupling member 65. The pair of the truncated cone-shaped pins 67 extending from the coupling members 65 are centered about the respective axis of rotation thereof whereby line contact is effected for the engaged length of the pins 67 by engagement of free ends thereof with facing surfaces of the respective other coupling member.

It is to be understood that while I have illustrated and described certain forms of my invention, it is not to be limited to these specific forms or arrangement of parts herein described and shown.

What I claim and desire to secure by Letters Patent is:
1. A coupling comprising:
   a. a pair of coupling members arranged in facing relation and each adapted to be secured to an elongated shaft coaxially aligned therewith, said coupling members having facing sides thereof substantially normal to a respective axis of rotation of said coupling members; and
   b. a plurality of elongate pins extending from facing sides of each of said coupling members and circumferentially spaced in a pattern concentric with the respective axis of rotation of said respective coupling member, each of said pins of each of said coupling members being received between and in line contact with a pair of adjacent pins extending from the other coupling member to transmit motion from one of said coupling members to the other coupling member, said line contact being substantially parallel with the axes of the coupling members, the engagement of said pins providing support of one coupling member by the other in self centering relation.

2. A coupling as set forth in claim 1 including an annular shield member mounted on each of said coupling members and surrounding said pins to thereby retain said pins against radially outward movement and thereby maintain said pins of one of said coupling members in engagement with the pins of the other coupling member.

3. A coupling as set forth in claim 1 wherein the pins extending from each of said coupling members are substantially rigid members to effect rotation of said coupling members at substantially identical speeds, and of high torque value.

4. A coupling as set forth in claim 1 wherein at least one of said coupling members is an annular disc having a plurality of circumferentially spaced teeth extending from the periphery thereof for interengaging with a member having similar teeth.

5. A coupling comprising:
   a. a plurality of mating coupling members each rotatable about a respective axis of rotation and arranged in generally facing relation with facing sides thereof being perpendicular to the respective axis of rotation of said coupling members;
   b. means on at least one of said coupling members for securing same to an elongated shaft coaxially aligned therewith; and
   c. a plurality of elongate pins extending from said facing sides of each of said coupling members and circumferentially spaced in a circular pattern concentric with the respective axis of rotation of said respective coupling member, said pins each being received between and in line contact with a pair of adjacent pins extending from an adjacent coupling member to transmit motion from one of said coupling members to the other coupling members, said line contact being substantially parallel with the axes of the coupling members and the rotation of both coupling members are uniform and at the same speed.

6. A coupling comprising:
   a. a pair of coupling members arranged in facing relation and each adapted to be secured to an elongated shaft coaxially aligned therewith, said coupling members having facing sides thereof substantially normal to a respective axis of rotation of said coupling members;
   b. a plurality of pins extending from facing sides of each of said coupling members and circumferentially spaced in a pattern concentric with the respective axis of rotation of said respective coupling member, each of said pins of each of said coupling members being received between and in line contact with a pair of adjacent pins extending from the other coupling member to transmit motion from one of said coupling members to the other coupling member;
   c. the pins extending from one of said coupling members being substantially rigid and the pins extending from the other coupling member being flexible members.

7. A coupling as set forth in claim 6 including a shield member mounted on at least one of said coupling members and surrounding said pins to thereby retain said flexible pins in engagement with the pins of the other coupling member.

8. A coupling comprising:
   a. a pair of coupling members arranged in facing relation and each adapted to be secured to an elongated shaft coaxially aligned therewith, said coupling members having facing sides thereof substantially normal to a respective axis of rotation of said coupling members;
   b. a plurality of pins extending from facing sides of each of said coupling members and circumferentially spaced in a pattern concentric with the respective axis of rotation of said respective coupling member, each of said pins of each of said coupling members being received between and in line contact with a pair of adjacent pins extending from the other coupling member to transmit motion from one of said coupling members to the other coupling member; and
   c. the pins extending from each of said coupling members being flexible members whereby rotation of one of said coupling members effects a lower torque change between said coupling members.

9. A coupling as set forth in claim 8 including a shield member mounted on each of said coupling members and surrounding said pins to thereby retain said pins of one of said coupling members in engagement with the pins of the other coupling member.

* * * * *